(12) United States Patent
Debe et al.

(10) Patent No.: US 7,311,990 B2
(45) Date of Patent: Dec. 25, 2007

(54) FORM-IN-PLACE FASTENING FOR FUEL CELL ASSEMBLIES

(75) Inventors: Mark K. Debe, Stillwater, MN (US); Andrew J. L. Steinbach, Minneapolis, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 331 days.

(21) Appl. No.: 11/025,267

(22) Filed: Dec. 29, 2004

(65) Prior Publication Data

US 2006/0142039 A1    Jun. 29, 2006

(51) Int. Cl.
*H01M 2/08* (2006.01)

(52) U.S. Cl. .............. 429/35; 429/34; 429/36

(58) Field of Classification Search ............ 49/35, 49/36, 34
See application file for complete search history.

(56) References Cited

U.S. PATENT DOCUMENTS

| | | | |
|---|---|---|---|
| 3,453,242 A | 7/1969 | Schmitt et al. | |
| 4,035,453 A | 7/1977 | Hittmair et al. | |
| 4,174,338 A | 11/1979 | Goller et al. | |
| 4,430,390 A | 2/1984 | Fekete | |
| 4,657,959 A | 4/1987 | Bryan et al. | |
| 5,118,290 A | 6/1992 | Müller et al. | |
| 5,569,691 A | 10/1996 | Guggenberger et al. | |
| 5,686,200 A | 11/1997 | Barton et al. | |
| 5,879,827 A | 3/1999 | Debe et al. | |
| 6,218,461 B1 | 4/2001 | Schwabe et al. | |
| 6,482,763 B2 | 11/2002 | Haugen et al. | |
| 6,780,536 B2 | 8/2004 | Debe et al. | |
| 2002/0081474 A1 | 6/2002 | Foster | |
| 2002/0110720 A1 | 8/2002 | Yang | |
| 2003/0162080 A1* | 8/2003 | DeAngelis et al. | ........... 429/40 |
| 2004/0096716 A1 | 5/2004 | Pierpont et al. | |
| 2004/0096724 A1 | 5/2004 | Debe et al. | |
| 2004/0096725 A1 | 5/2004 | Mao et al. | |
| 2004/0107869 A1 | 6/2004 | Velamakanni et al. | |
| 2004/0137303 A1 | 7/2004 | Kuroki et al. | |

FOREIGN PATENT DOCUMENTS

| | | |
|---|---|---|
| DE | 1 153 169 | 8/1963 |
| DE | 40 19 249 A1 | 8/1991 |
| WO | WO 02/11226 A2 | 2/2002 |
| WO | WO 03/026049 A2 | 3/2003 |
| WO | WO 2004/062019 A1 | 7/2004 |

OTHER PUBLICATIONS

U.S. Appl. No. 10/699,454, filed Oct. 31, 2003.

* cited by examiner

*Primary Examiner*—Patrick Joseph Ryan
*Assistant Examiner*—Ben Lewis
(74) *Attorney, Agent, or Firm*—Mark A. Hollingsworth; Philip Y. Dahl

(57) ABSTRACT

A fuel cell sub-assembly includes first and second flow field plates each comprising several fastener apertures defined at a number of fastening locations. A membrane electrode assembly is situated between the first and second flow field plates and includes several fastener apertures defined at a number of fastening locations, the respective fastener apertures aligned to define fastening holes. A form-in-place fastener formed of an elastomeric material is disposed in each of the fastening holes. The elastomeric material facilitates volumetric displacement of the form-in-place fasteners in response to placing the fuel cell sub-assembly in compression.

38 Claims, 5 Drawing Sheets

US 7,311,990 B2

FORM-IN-PLACE FASTENING FOR FUEL CELL ASSEMBLIES

FIELD OF THE INVENTION

The present invention relates generally to fastening arrangements for fuel cell components and, more particularly, to in-situ curable elastomeric fastening arrangements for fuel cell components and assemblies.

BACKGROUND OF THE INVENTION

A typical fuel cell system includes a power section in which one or more fuel cells generate electrical power. A fuel cell is an energy conversion device that converts hydrogen and oxygen into water, producing electricity and heat in the process. Each fuel cell unit may include a proton exchange member at the center with gas diffusion layers on either side of the proton exchange member. Anode and cathode catalyst layers are respectively positioned at the inside of the gas diffusion layers. This unit is referred to as a membrane electrode assembly (MEA). Separator plates or flow field plates are respectively,positions on the outside of the gas diffusion layers of the membrane electrode assembly. This type of fuel cell is often referred to as a PEM fuel cell.

The reaction in a single fuel cell typically produces less than one volt. A plurality of the fuel cells may be stacked and electrically connected in series to achieve a desired voltage. Electrical current is collected from the fuel cell stack and used to drive a load. Fuel cells may be used to supply power for a variety of applications, ranging from automobiles to laptop computers.

The efficacy of the fuel cell power system depends largely in part on the integrity of the various contacting and sealing interfaces within individual fuel cells of the fuel cell stack. Such contacting and sealing interfaces include those associated with the transport of fuels, coolants, and effluents within and between fuel cells of the stack. Proper positional alignment of fuel cell components and assemblies within a fuel cell stack is critical to ensure efficient operation of the fuel cell system. Misalignment of fuel cell components resulting from handling during assembly of fuel cell sub-assemblies, for example, can lead to failure of individual fuel cells and degradation of fuel cell system performance.

SUMMARY OF THE INVENTION

The present invention is directed to fastening arrangements for fuel cell components and methods of assembling fuel cell components using such fastening arrangements. Embodiments of the invention include elastomeric fastening arrangements that are formed in-situ during assembly of a fuel cell sub-assembly.

According to one embodiment, a fuel cell sub-assembly includes a first flow field plate comprising several fastener apertures defined at a number of fastening locations. A second flow field plate includes several fastener apertures defined at a number of fastening locations. A membrane electrode assembly is situated between the first and second flow field plates and includes several fastener apertures defined at a number of fastening locations. The respective fastener apertures of the membrane electrode assembly and the first and second flow field plates define fastening holes. A form-in-place fastener formed of an elastomeric material is disposed in each of the fastening holes. The elastomeric material facilitates volumetric displacement of the form-in-place fasteners in response to placing the fuel cell sub-assembly in compression.

In accordance with another embodiment, a method of managing compression within a fuel cell sub-assembly involves providing first and second flow field plates each comprising several fastener apertures defined at a number of fastening locations. A membrane electrode assembly is provided between the first and second flow field-plates and comprises several fastener apertures defined at a number of fastening locations, the respective fastener apertures defining fastening holes. The method also involves providing a form-in-place fastener formed of an elastomeric material disposed in each of the fastening holes. The method further involves placing the fuel cell sub-assembly in compression, and accommodating compressive strain by the form-in-place fasteners in response to placing the fuel cell sub-assembly in compression.

In accordance with another embodiment, a method of assembling a fuel cell sub-assembly involves providing first and second flow field plates and a membrane electrode assembly situated therebetween, each comprising several fastener apertures defined at a number of fastening locations. The method further involves aligning the fastener apertures of the membrane electrode assembly and the first and second flow field plates to define fastening holes, and flowing a pre-elastomeric material into the fastening holes to form form-in-place fasteners therein.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1A:
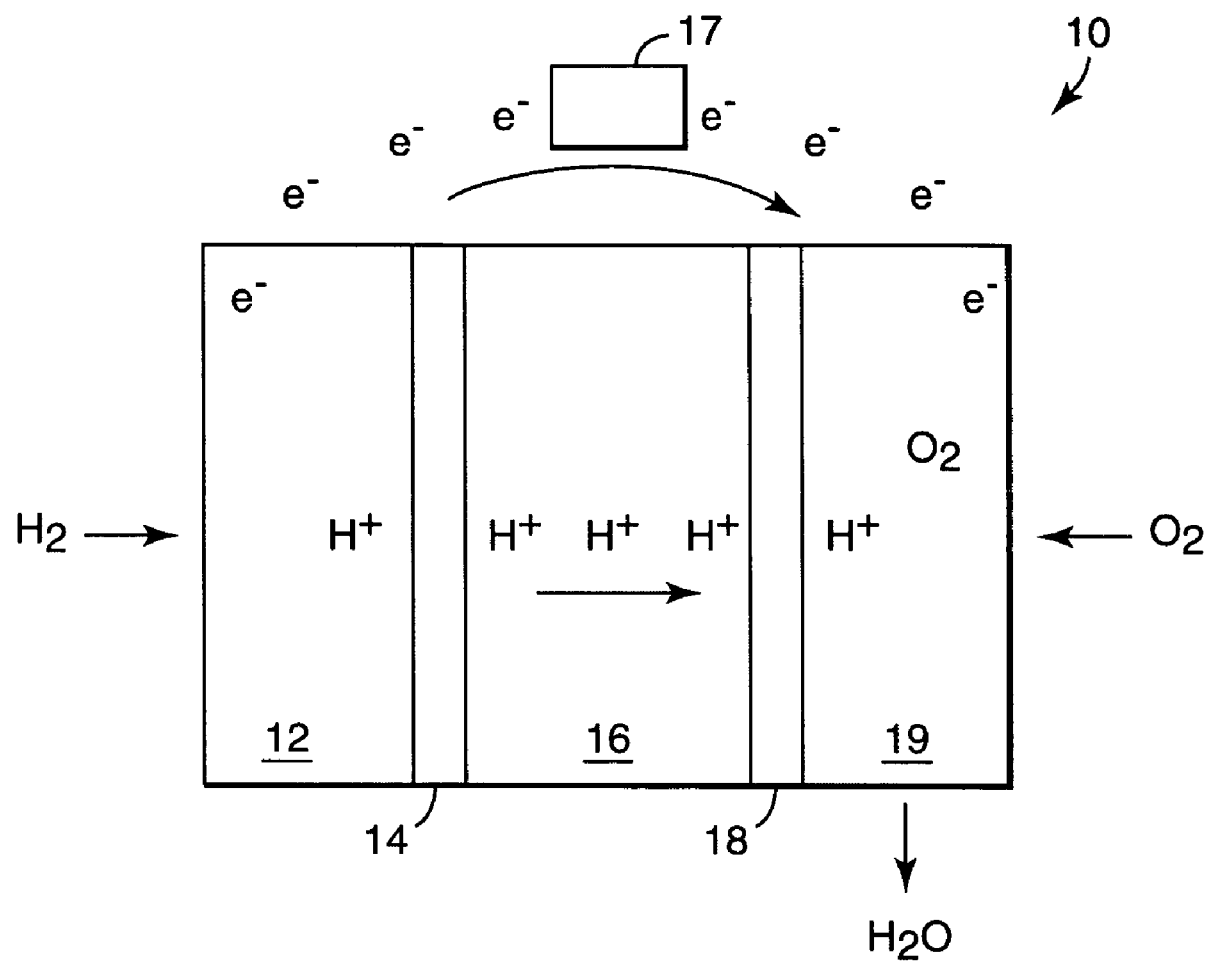
FIG. 1a is an illustration of a fuel cell and its constituent layers.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

Aspects of the present invention will generally be described within the context of fuel cell assemblies and sub-assemblies, stacks of fuel cells, and power systems employing fuel cells. Although a fastening approach according to the present invention is particularly advantageous in the context of fuel cell assemblies, it will be appreciated that the principles of the present invention may be implemented in a wide variety of fastening applications. Accordingly, the specific illustrative embodiments described below are for purposes of explanation, and not of limitation.

A fastening methodology of the present invention may be incorporated in fuel cell assemblies and stacks of varying types, configurations, and technologies. A typical fuel cell is depicted in FIG. 1a. A fuel cell is an electrochemical device that combines hydrogen fuel and oxygen from the air to produce electricity, heat, and water. Fuel cells do not utilize combustion, and as such, fuel cells produce little if any hazardous effluents. Fuel cells convert hydrogen fuel and oxygen directly into electricity, and can be operated at much higher efficiencies than internal combustion electric generators, for example.

The fuel cell 10 shown in FIG. 1a includes a first diffuser/current collector (DCC) 12 adjacent an anode 14. Adjacent the anode 14 is an electrolyte membrane 16. A cathode 18 is situated adjacent the electrolyte membrane 16, and a second diffuser/current collector 19 is situated adjacent the cathode 18. In operation, hydrogen fuel is introduced into the anode portion of the fuel cell 10, passing through the first diffuser/current collector 12 and over the anode 14. At the anode 14, the hydrogen fuel is separated into hydrogen ions ($H^+$) and electrons ($e^-$).

The electrolyte membrane 16 permits only the hydrogen ions or protons to pass through the electrolyte membrane 16 to the cathode portion of the fuel cell 10. The electrons cannot pass through the electrolyte membrane 16 and, instead, flow through an external electrical circuit in the form of electric current. This current can power an electric load 17, such as an electric motor, or be directed to an energy storage device, such as a rechargeable battery.

Oxygen flows into the cathode side of the fuel cell 10 via the second diffuser/current collector 19. As the oxygen passes over the cathode 18, oxygen, protons, and electrons combine to produce water and heat.

Individual fuel cells, such as that shown in FIG. 1a, can be packaged as unitized fuel cell assemblies as described below. The unitized fuel cell assemblies, referred to herein as unitized cell assemblies (UCAs), can be combined with a number of other UCAs to form a fuel cell stack. The UCAs may be electrically connected in series with the number of UCAs within the stack determining the total voltage of the stack, and the active surface area of each of the cells determines the total current. The total electrical power generated by a given fuel cell stack can be determined by multiplying the total stack voltage by total current.

A number of different fuel cell technologies can be employed to construct UCAs in accordance with the principles of the present invention. For example, a UCA packaging methodology of the present invention can be employed to construct proton exchange membrane (PEM) fuel cell assemblies. PEM fuel cells operate at relatively low temperatures (about 175° F./80° C.), have high power density, can vary their output quickly to meet shifts in power demand, and are well suited for applications where quick startup is required, such as in automobiles for example.

The proton exchange membrane used in a PEM fuel cell is typically a thin solid polymer electrolyte sheet that allows hydrogen ions to pass through it, but yet separates the gaseous reactants. The membrane is typically coated on both sides with highly dispersed metal or metal alloy particles (e.g., platinum or platinum/ruthenium) that are active catalysts. The electrolyte used is typically a solid perfluorinated sulfonic acid polymer. Use of a solid electrolyte is advantageous because it reduces corrosion and electrolyte containment problems.

Hydrogen is fed to the anode side of the fuel cell where the catalyst promotes the hydrogen atoms to release electrons and become hydrogen ions (protons). The electrons travel in the form of an electric current that can be utilized before it returns to the cathode side of the fuel cell where oxygen has been introduced. At the same time, the protons diffuse through the membrane to the cathode, where the hydrogen ions are recombined and reacted with oxygen to produce water.

A membrane electrode assembly (MEA) is the central element of PEM fuel cells, such as hydrogen fuel cells. As discussed above, typical MEAs comprise a polymer electrolyte membrane (PEM) (also known as an ion conductive membrane (ICM), which functions as a solid electrolyte.

One face of the PEM is in contact with an anode catalyst electrode layer and the opposite face is in contact with a cathode catalyst electrode layer. Each electrode layer includes electrochemical catalysts, typically including platinum metal. Diffuser/current collectors facilitate gas transport to and from the anode and cathode electrode materials and conduct electrical current from the catalyst layers to the separator or flow field plates.

In a typical PEM fuel cell, protons are formed at the anode via hydrogen oxidation and transported to the cathode to react with oxygen, allowing electrical current to flow in an external circuit connecting the electrodes.

The DCC may also be called a gas diffusion layer (GDL). The anode and cathode electrode layers may be applied to the PEM or to the DCC during manufacture, so long as they are disposed between PEM and DCC in the completed MEA.

Any suitable PEM may be used in the practice of the present invention. Useful PEM thicknesses range between about 200 μm and about 15 μm. The PEM is typically comprised of a polymer electrolyte that is an acid-functional fluoropolymer, such as Nafion® (DuPont Chemicals, Wilmington Del.), Flemion® (Asahi Glass Co. Ltd., Tokyo, Japan), and polymers having a highly fluorinated backbone and recurring pendant groups according to the formula $YOSO_2$—$CF_2$—$CF_2$—$CF_2$—$CF_2$—O-[polymer backbone] where Y is $H^+$ or another monovalent cation, such as an alkali metal cation. The latter polymers are described in WO2004062019. The polymer electrolytes useful in the present invention are typically preferably copolymers of tetrafluoroethylene and one or more fluorinated, acid-functional comonomers.

Typically, the polymer electrolyte bears sulfonate functional groups. The polymer electrolyte typically has an acid equivalent weight of 1200 or less, more typically 1100, and most typically about 1000. Equivalent weights as low as 800 or even 700 might be used.

Any suitable DCC may be used in the practice of the present invention. Typically, the DCC is comprised of sheet material comprising carbon fibers. The DCC is typically a carbon fiber construction selected from woven and non-woven carbon fiber constructions. Carbon fiber constructions which may be useful in the practice of the present invention may include: Toray Carbon Paper, SpectraCarb Carbon Paper, AFN non-woven carbon cloth, Zoltek Carbon Cloth, and the like. The DCC may be coated or impregnated with various materials, including carbon particle coatings, hydrophilizing treatments, and hydrophobizing treatments such as coating with polytetrafluoroethylene (PTFE).

Any suitable catalyst may be used in the practice of the present invention, including platinum blacks or fines, ink containing carbon-supported catalyst particles (as described in US 20040107869 and herein incorporated by reference), or nanostructured thin film catalysts (as described in U.S. Pat. No. 6,482,763 and U.S. Pat. No. 5,879,827, both incorporated herein by reference). The catalyst may be applied to the PEM or the DCC by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications.

Direct methanol fuel cells (DMFC) are similar to PEM cells in that they both use a polymer membrane as the electrolyte. In a DMFC, however, the anode catalyst itself draws the hydrogen from liquid methanol fuel, eliminating the need for a fuel reformer. DMFCs typically operate at a temperature between 40-90° C. A direct methanol fuel cell can be subject to UCA packaging in accordance with the principles of the present invention.

Figure 1B:
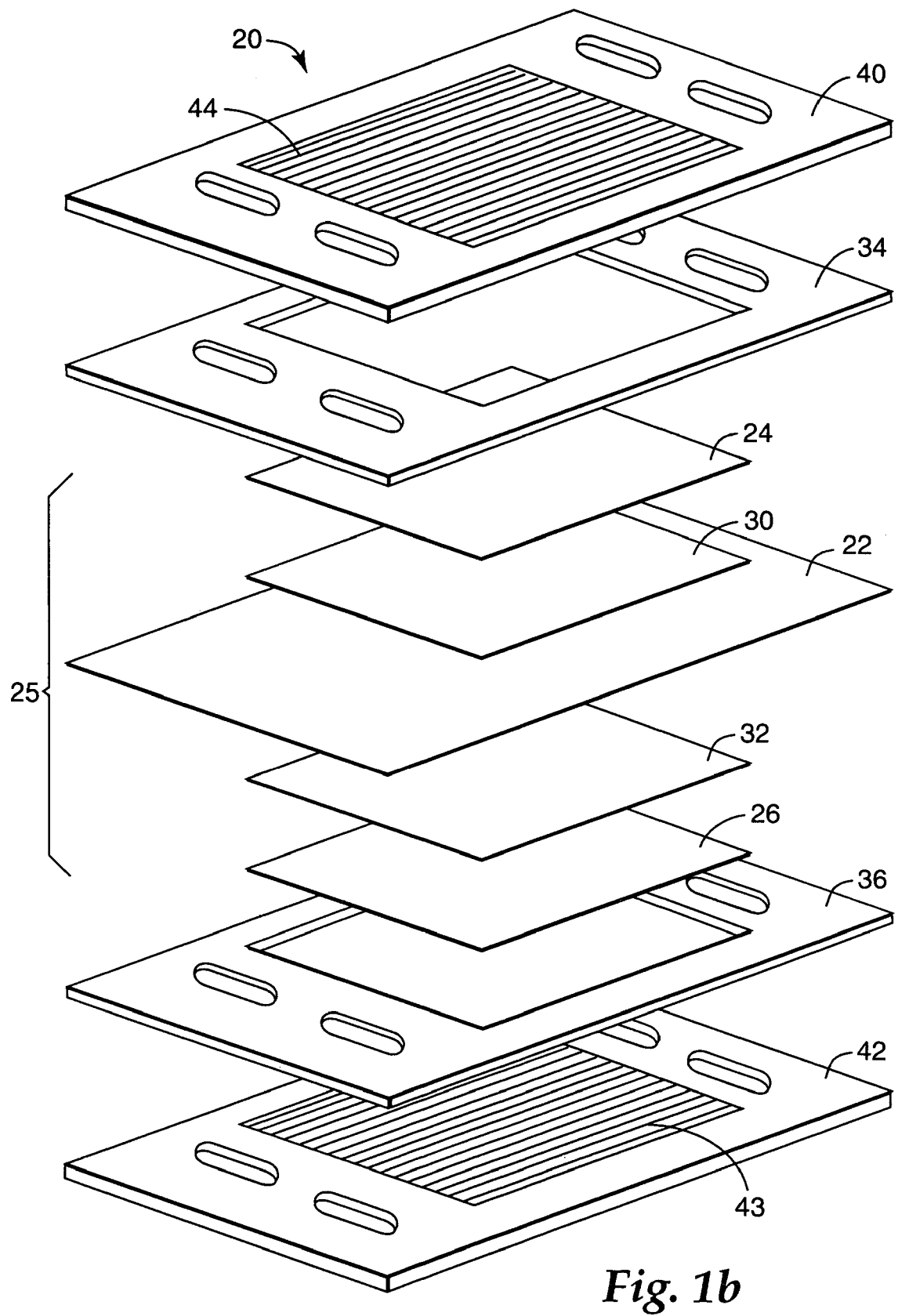
FIG. 1b illustrates a unitized cell assembly having monopolar flow field plates in accordance with an embodiment of the present invention.

Referring now to FIG. 1b, there is illustrated an embodiment of a UCA implemented in accordance with a PEM fuel cell technology. As is shown in FIG. 1b, a membrane electrode assembly (MEA) 25 of the UCA 20 includes five component layers. A PEM layer 22 is sandwiched between DCC layers 24 and 26, or gas diffusion layers (GDLs) for example. An anode catalyst 30 is situated between a first DCC 24 and the membrane 22, and a cathode catalyst 32 is situated between the membrane 22 and a second DCC 26.

In one configuration, a PEM layer 22 is fabricated to include an anode catalyst coating 30 on one surface and a cathode catalyst coating 32 on the other surface. This structure is often referred to as a catalyst-coated membrane or CCM. According to another configuration, the first and second DCCs 24, 26 are fabricated to include an anode and cathode catalyst coating 30, 32, respectively. In yet another configuration, an anode catalyst coating 30 can be disposed partially on the first DCC 24 and partially on one surface of the PEM 22, and a cathode catalyst coating 32 can be disposed partially on the second DCC 26 and partially on the other surface of the PEM 22.

The DCCs 24, 26 are typically fabricated from a carbon fiber paper or non-woven material or woven cloth. Depending on the product construction, the DCCs 24, 26 can have carbon particle coatings on one side. The DCCs 24, 26, as discussed above, can be fabricated to include or exclude a catalyst coating.

In the particular embodiment shown in FIG. 1b, MEA 25 is shown sandwiched between a first edge seal system 34 and a second edge seal system 36. The edge seal systems 34, 36 provide the necessary sealing within the UCA package to isolate the various fluid (gas/liquid) transport and reaction regions from contaminating one another and from inappropriately exiting the UCA 20, and may further provide for electrical isolation and hard stop compression control between flow field plates 40, 42.

Flow field plates 40 and 42 are positioned adjacent the first and second edge seal systems 34 and 36, respectively. Each of the flow field plates 40, 42 includes a field of gas flow channels 43 and ports through which hydrogen and oxygen feed fuels pass. The flow field plates 40, 42 may also incorporate coolant channels and ports. The coolant channels are incorporated on surfaces of the flow field plates 40, 42 opposite the surfaces incorporating the gas flow channels 43.

In the configuration depicted in FIG. 1b, flow field plates 40, 42 are configured as monopolar flow field plates, in which a single MEA 25 is sandwiched there between. The flow field in this and other embodiments may be a low lateral flux flow field as disclosed in commonly owned U.S. Pat. No. 6,780,536, which is incorporated herein by reference.

Figure 1C:
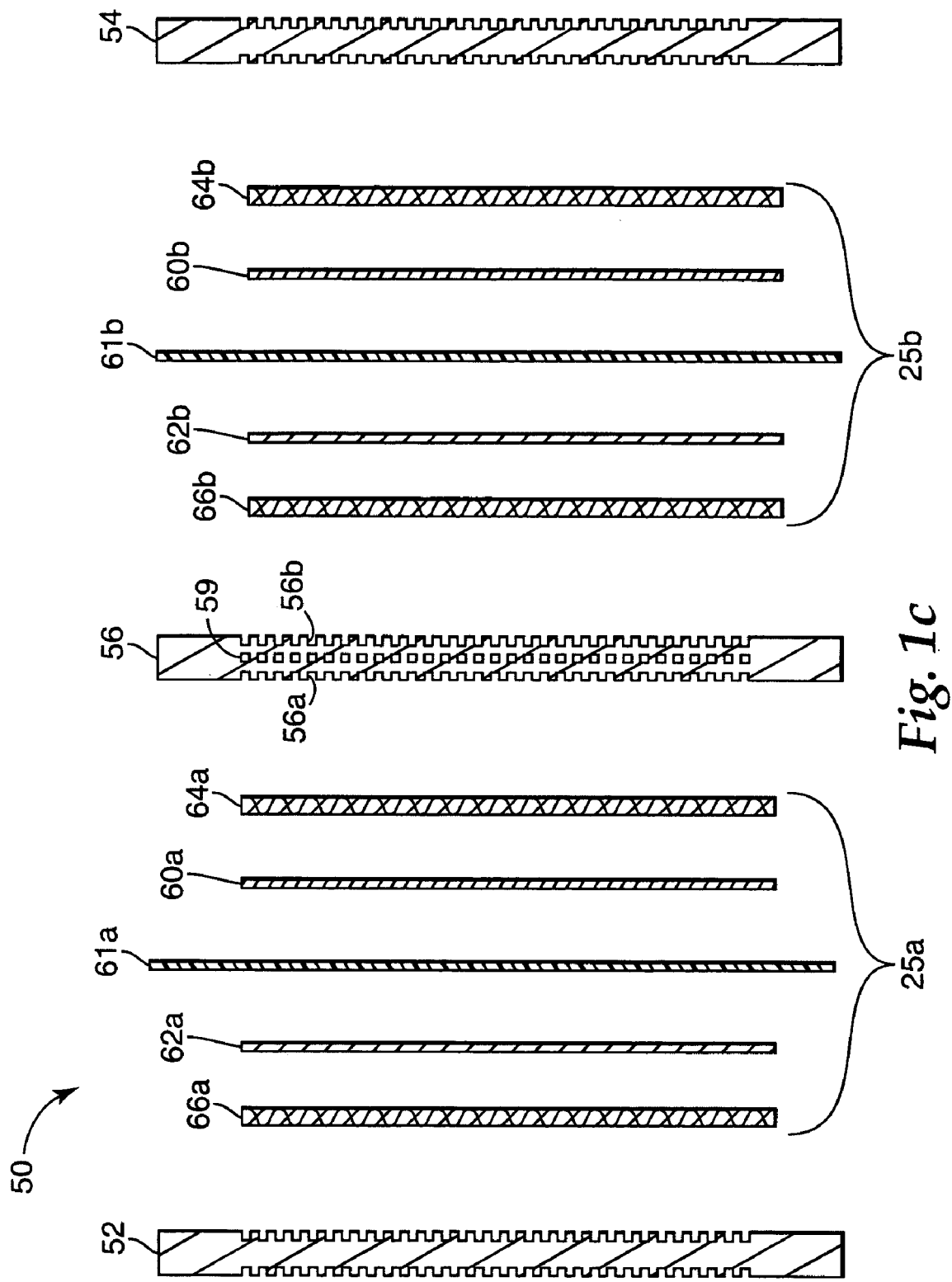
FIG. 1c illustrates a unitized cell assembly having a monopolar/bipolar plate configuration in accordance with an embodiment of the present invention.

FIG. 1c illustrates a UCA, or multi-cell assembly MCA, 50 which incorporates multiple MEAs 25 through employment of one or more bipolar flow field plates 56. In the configuration shown in FIG. 1c, UCA 50 incorporates two MEAs 25a and 25b and a single bipolar flow field plate 56, which incorporates integral cooling channels 59. MEA 25a includes a cathode 62a/membrane 61a/anode 60a layered structure sandwiched between DCCs 66a and 64a. DCC 66a is situated adjacent a flow field end plate 52, which may be configured as a monopolar flow field plate or a bipolar plate, with integral cooling channels 59 as is shown for bipolar plate 56. DCC 64a is situated adjacent a first flow field surface 56a of bipolar flow field plate 56. Similarly, MEA 25b includes a cathode 62b/membrane 61b/anode 60b layered structure sandwiched between DCCs 66b and 64b. DCC 64b is situated adjacent a flow field end plate 54, which may be configured as a monopolar flow field plate or a bipolar plate, with integral cooling channels 59 as is shown for bipolar plate 56. DCC 66b is situated adjacent a second flow field surface 56b of bipolar flow field plate 56.

The UCA configurations shown in FIGS. 1b and 1c are representative of two particular arrangements that can be implemented for use in the context of a form-in-place fastening methodology in accordance with the present invention. These two arrangements are provided for illustrative purposes only, and are not intended to represent all possible configurations coming within the scope of the present invention. Rather, FIGS. 1b and 1c are intended to illustrate various components that can be selectively incorporated into a particular fuel cell assembly design.

Aspects of the invention are directed to a fastener and methods for assembling a fuel cell assembly or sub-assembly. Aspects of the invention are further directed to fuel cell stacks that are built by stacking sub-units of multiple cell assemblies (MCAs) or UCAs together, where each MCA (or UCA) module is itself a "short-stack" that incorporates at least one membrane electrode assembly (MEA) and at least two bi-polar or uni-polar flow field plates (or mixed pairs of bi-polar and uni-polar flow field plates).

By way of example, and in accordance with one embodiment, a fuel cell sub-assembly includes a pair of flow field plates each having several fastener apertures provided at a number of fastening locations. A membrane electrode assembly is situated between the two flow field plates and also incorporates several fastener apertures at a number of fastening locations. The fastener apertures of the MEA and the pair of flow field plates align to define fastening holes. A form-in-place fastener, formed of an elastomeric material, is disposed in each of the fastening holes. The elastomeric material facilitates volumetric displacement of the form-in-place fasteners in response to placing the fuel cell sub-assembly in compression.

Embodiments of fastener arrangements and methods of fastening according to the present invention employ a form-in-place fastener formed of an elastomeric material for holding components of a fuel cell assembly, sub-assembly or module together with a high degree of alignment accuracy prior to full compression in a stack. A fastening approach of the present invention allows for variations in thickness of the MCAs during compression of the full fuel cell stack, by accommodating variations in compressive strain that occur as the stack's compressive forces are applied.

As discussed previously, a fastener arrangement of the present invention may be incorporated in MCA modules. Such MCA modules can include an arbitrary number of MEAs and associated bi- or uni-polar flow field plates. Generally, however, it is believed that two to four MEAs is a useful number, since one objective of the sub-stack module is to allow underperforming MEA to be removed from the stack without disrupting the remaining MEAs in the stack.

Figure 2:
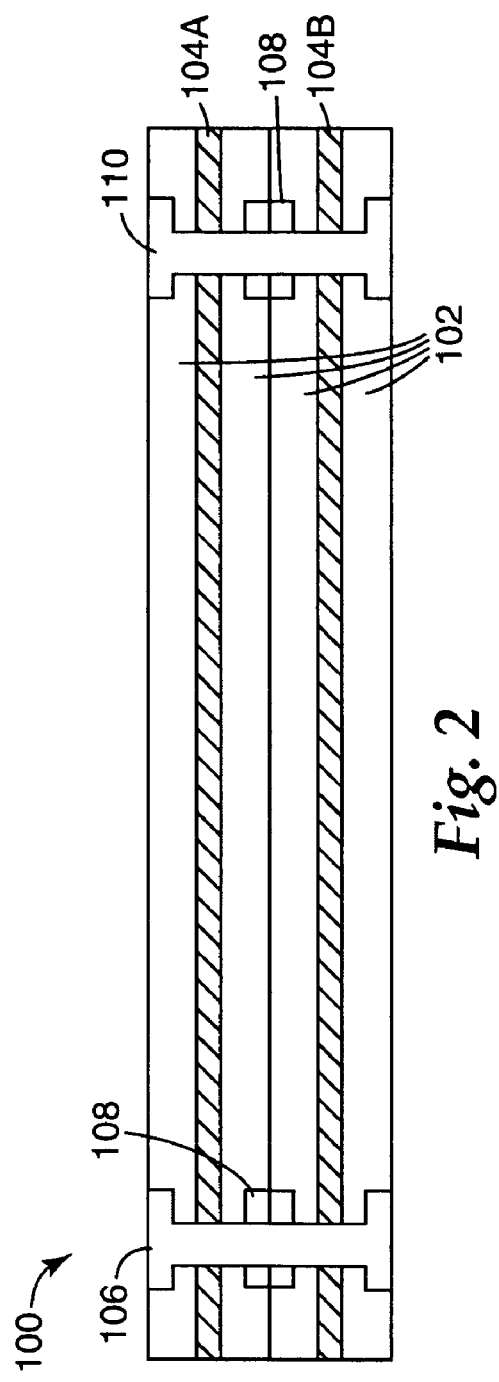
FIG. 2 is a sectional view of a multiple cell assembly that employs a form-in-place fastener arrangement in accordance with an embodiment of the present invention.

Turning now to FIG. 2, there is shown a sectional view of a multiple cell assembly that employs a form-in-place fastener arrangement in accordance with an embodiment of the present invention. As is shown in FIG. 2, MCA 100 incorporates two MEAs 104A, 104B and four uni-polar flow field plates 102. A uni-polar plate is distinguished from a bi-polar plate in that a bi-polar plate has both anode and cathode reactant flow fields on its opposing surfaces, whereas a uni-polar plate has only one type of reactant flow field on one surface, and coolant channels on the opposing surface. It is understood that MCA 100 may incorporate one or more bi-polar flow field plates, in addition to, or in substitution for, one or more of the uni-polar plates 102 shown in FIG. 2.

The uni-polar plates 102 are typically thin and may be formed from metal, graphite, or other suitable material. For example, the uni-polar plates 102 may have a thickness of about 1 mm to about 6 mm. Such thin plates 102, in the lower range, are necessary to obtain high stack power densities (e.g., 0.8 kW/liter or larger), as is required for automotive fuel cell applications for example. In assembling MCA modules with such thin plates, the total thickness of the MCA under compression would be only on the order of 0.5 cm thick. The structures separating the cooling channels may be referred to as "lands". The alignment of the cooling channel lands of adjacent uni-polar plates 102 must be held to tight tolerances of a few percent of the land widths in order to not interfere with the coolant flow or reduce the land-to-land contact area and thereby increase the plate to plate resistance to current flow.

It is conceivable to use a mechanical type demountable screw, rivet, grommet or other such device to hold the plates 102 and MEAs 104A, 104B in alignment with reasonable strength prior to their incorporation into a fuel cell stack. However, no commercially available fastener device could be found to hold the four uni-polar plates together given the extreme thinness of the assembly. Also, it could not be expected that such small devices could apply the compressive force required of about 100-200 psi (700-1400 kPa) to completely compress the gaskets and MEAs of a given fuel cell assembly. This implies that any such MCA fastening devices would have to accommodate the additional compressive strain occurring when the MCAs are assembled into the fuel cell stack and the full stack compression is applied.

A fastening approach of the present invention that solves this problem employs an in-situ formed elastomeric fastener 110, which may be formed as an elastomeric rivet, for example. Fasteners 110 are formed within fastening holes 106. Fastening holes 106 are formed by aligned fastener apertures in the flow field plates 102 and MEAs 104A, 104B.

Figure 3:
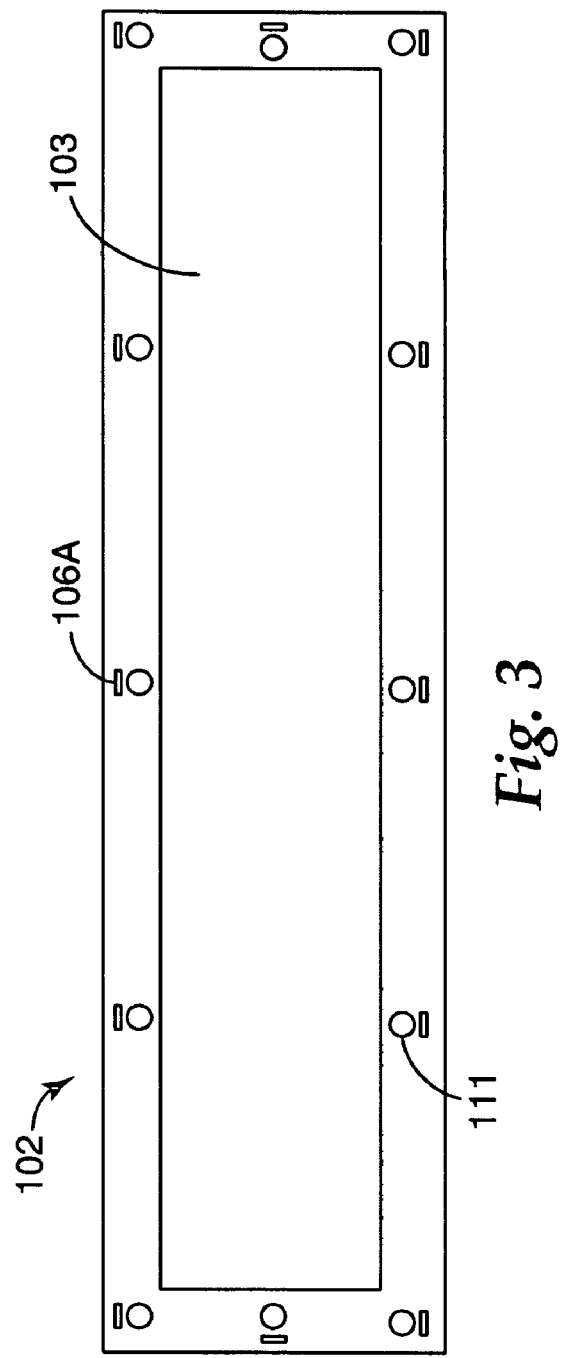
FIG. 3 is a top view of a uni-polar plate shown in FIG. 2.

FIG. 3 is a top view of a uni-polar plate 102 according to one configuration. The plate 102 incorporates a number of fastener apertures 106A that, together with fastener apertures of one or more MEAs and other uni-polar plates (or bi-polar plates), define fastening holes 106 (shown in FIGS. 2, 4, and 5) configured to receive a flowable, curable elastomeric material. The size and shape of fastener apertures 106A may vary from those shown in FIG. 3, but are preferably configured to facilitate dispensing of a flowable pre-elastomeric material therethrough (e.g., operate as injection ports).

Adjacent each of the fastener apertures 106A is a hole 111 through which a tie rod or bolt passes when the fuel cell stack is assembled, it being understood that the holes 111 may be spaced apart or offset from fastener apertures 106A. The central region 103 is an active region of the plate 102 (either or both sides), such as an anode or cathode reactant flow field region or a coolant channel region. The locations of the fastener apertures 106A and holes 111 are preferably selected to maximize the area of the active region 103, yet provide sufficient spacing for gaskets, seals or other structures that provide the requisite isolation between reactant gas and coolant pathways.

The fastener apertures 106A (and therefore fastening holes 106) may be distributed about a peripheral region of the plate 102, as is shown in the illustrative plate configuration of FIG. 3. The fastening holes 106 for a given fuel cell assembly configuration are preferably sufficient in number to hold the assembly elastomerically in in-situ cured registration, sufficient for handling prior to and during fuel cell stack assembly. By way of example, a fuel cell assembly or sub-assembly may include one fastening hole 106 per about 15 cm$^2$ to about 25 cm$^2$ of flow field plate area. By way of further example, a ratio of flow field plate area to the sum of the minimal cross sectional area of the fastening holes 106 may be in the range of about 200:1 to about 400:1.

Figure 4:
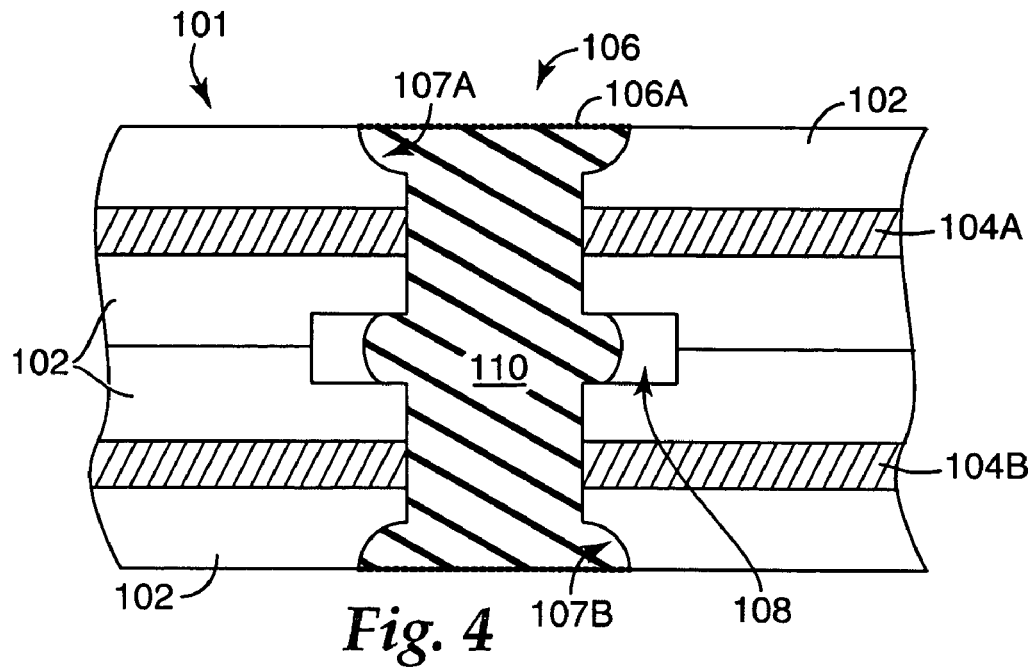
FIG. 4 shows a portion of a multiple cell assembly that incorporates a fastening hole within which an in-situ formed elastomeric fastener is disposed, the fastening hole configured to include one or more voids that accommodate fastener volumetric deformation due to fuel cell stack compression.
Figure 5:
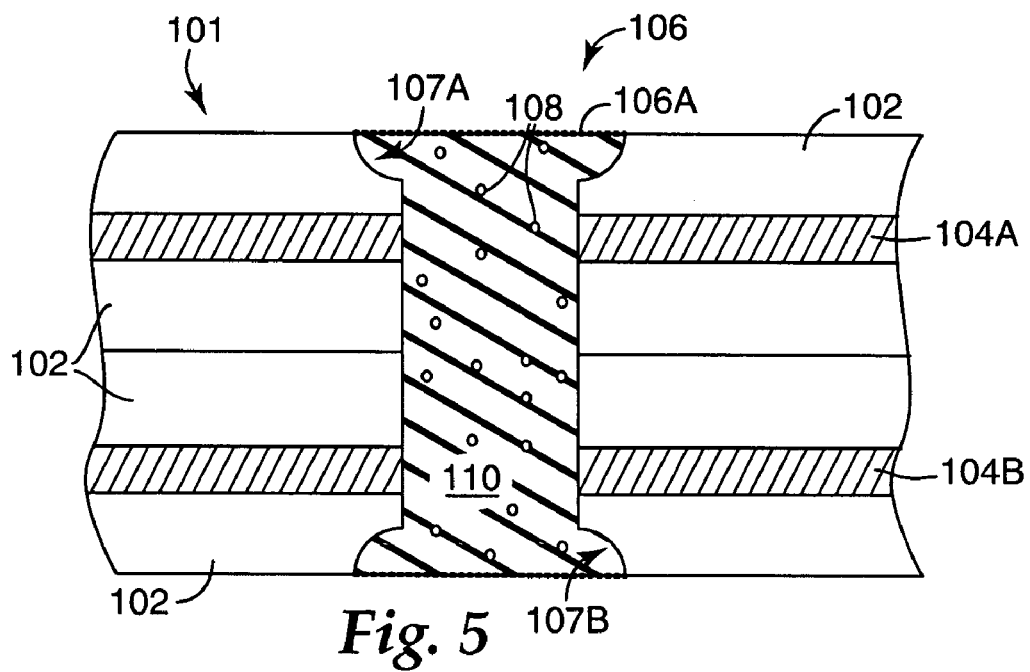
FIG. 5 shows a portion of a multiple cell assembly that incorporates a fastening hole without necessity of the voids shown in FIG. 4, the elastomeric material from which the fastener is formed incorporating gas or other compressible elements that accommodate volumetric displacement of the bulk fastener material during fuel cell stack compression.

FIGS. 4 and 5 show two embodiments of a form-in-place fastener of the present invention. FIG. 4 shows a portion of an MCA 101 that incorporates two MEAs 104A, 104B and four uni-polar flow field plates 102. The MCA 101 includes a fastening hole 106 within which an in-situ formed elastomeric fastener 110 is disposed. In this embodiment, the fastening hole 106 is configured to include one or more voids 108 that remain substantially free of elastomeric material after a flowable pre-elastomeric material has been dispensed into the fastening hole 106 to form the fastener 110.

The voids 108 represent free volume within the fastening hole 106 that can accept the deformable, but incompressible, elastomeric material during stack compression. For example, the voids 108 represent volume within the fastening hole 106 unfilled by the form-in-place fastener 110 at less than final compression of the fuel cell stack compression. The voids 108 may also represent volume within the fastening hole 106 unfilled after in-situ formation of the form-in-place fastener 110 within the fastening hole 106. When MCA 101 is placed in a fuel cell stack and compressed between the stack end-plates by use of tie rods or bolts, the in-situ formed elastomeric fastener 110 deforms and, if needed, expands into any unfilled void 108 within the fastening hole 106.

In the embodiment shown in FIG. 5, the fastening hole 106 need not be configured to include the voids 108 shown in FIG. 4. According to this embodiment, the flowable pre-elastomeric material from which the fastener 110 is formed incorporates gas or other compressible elements that accommodate volumetric displacement of the bulk fastener material during MCA compression. In this embodiment, the in-situ curable elastomeric material from which the fastener 110 is formed may be a gas-blown elastomeric material, a cellular elastomeric rubber, or elastomeric material impregnated with compressible hollow beads, for example. When the MCA 101 is placed in a fuel cell stack and compressed between the stack end-plates, deformation of the in-situ formed elastomeric fastener 110 is accommodated by the voids (e.g., gas bubbles) or compressive elements (e.g., hollow beads) within the fastener 110 itself.

The fastening hole 106 preferably incorporates a feature that facilitates mechanical capture of the two exterior flow field plates 102. This feature facilitates maintenance of the MCA 101 in elastomeric in-situ cured registration, which is important when handling the MCA for fuel cell stack assembly as discussed above. The capture feature shown in FIGS. 4 and 5 includes a lip void 107A adjacent an exterior surface of an upper flow field plate 102 and a lip void 107B adjacent an exterior surface of a lower flow field plate 102. When the flowable pre-elastomeric material is dispensed into the fastening hole 106, some of the material flows into the respective lip voids 107A and 107B. After curing, the elastomeric material within the lip voids 107A, 107B facilitates mechanical capture of the two exterior flow field plates 102.

A fastening arrangement of the present invention incorporates a form-in-place fastener 110 formed of a curable elastomeric material, more preferably an in-situ curable elastomeric material. The form-in-place fastener 110 may be formed of a phase change elastomeric material, such as a hydrocarbon thermal phase change material (e.g., a tough wax or a composite of a wax and elastomeric fibers). Suitable materials for forming a fastener 110 of the present invention include a silicone material, a rubber material, or a dental impression material. A suitable dental impression material is a 2-part polysiloxane dental impression material, available from 3M Co. as Imprint™ II Garant™ Regular Bodied Consistency, No. 9379.

Suitable elastomeric materials for forming a fastener 110 of the present invention include those that are curable in accordance with an addition cure, condensation cure, radiation cure, thermal cure, or free radical cure. Useful addition cured silicone impression materials include those disclosed in U.S. Pat. Nos. 4,035,453 and 4,657,959, which are hereby incorporated herein by reference. Useful addition cured polyethers includes those disclosed in DE 4019249 A1. Useful condensation cured silicone impression materials includes those disclosed in U.S. Pat. Nos. 6,218,461; 5,118,290; and 4,174,338, which are hereby incorporated herein by reference, and in DE 1153169. Useful aziridinopolyether impression materials include those disclosed in U.S. Pat. Nos. 5,569,691 and 3,453,242, which are hereby incorporated herein by reference.

In accordance with another embodiment, a method of assembling a fuel cell sub-assembly involves providing a pair of flow field plates and an MEA, each having several fastener apertures provided at a number of fastening locations. The assembly method further involves aligning the fastener apertures of the flow field plates and MEA to define fastening holes, applying mechanical pressure to both sides of the MEA to partially compress it, and flowing a pre-elastomeric material into the fastening holes to form form-in-place fasteners therein. The elastomeric material is preferably subject to in-situ curing within the fastening holes. For example, the assembling method may involve curing or solidifying the pre-elastomeric material to form an elastomeric material within the fastening holes.

According to one embodiment, one or more MCAs are assembled in a suitable jig that holds and partially compresses the MEA and uni-polar plates to some arbitrary large fraction of the maximum strain and with the required registration precision. A flowable, in-situ curable elastomeric material (e.g., a 2-part silicone material) is dispensed into aligned fastening holes formed in the plates, MEA, and gasket dies for this purpose. The elastomeric material fills the fastening holes and cures quickly (e.g., 5-8 minutes at room temperature.) As previously discussed with regard to one embodiment, there is in practice some void volume within the fastening holes of the stacked plates that remains unfilled after dispensing of the elastomeric material in the fastening holes. These voids represent important free volume needed to accept the deformable, but incompressible, elastomeric material during fuel cell stack compression.

After curing, the excess material is sliced off parallel to the surface of the plate with a sharp edged blade. When the MCA is removed from the jig, it expands slightly, and because the elastomeric material can stretch, it does so without breaking while holding the plates, gaskets, and MEA in registry. Then, when the MCAs are stacked to form the fuel cell stack assembly, and compressed with the bolts between the stack end-plates, the in-situ formed fasteners compress and if needed, expand into any unfilled void in the fastening holes.

The following are examples of various methods of assembling fuel cell sub-assemblies in accordance with the principles of the present invention, with reference being made to FIGS. 2 and 3:

EXAMPLE 1

The uni-polar plate 102 depicted in FIGS. 2 thru 4 is designed for a 5 kW fuel cell stack in this illustrative example. Through-holes or apertures 106A are indicated for forming the in-situ elastomeric fasteners on the perimeter of the upper and lower plates 102. Two identical MCAs 100, each incorporating four such plates 102 and two MEAs 104 with gaskets between each uni-polar plate 102, were fabricated using the in-situ formed silicone rubber fastener 110 as described above. The plates 102, gaskets and MEAs 104 were first stacked sequentially together and held in alignment under partial compression in a jig made especially for the task.

The 3M dental siloxane impression material identified above was applied to each side of the through-holes 106A so there was complete continuity of the silicone between both sides of an MCAs 100. After curing, and removal of the first MCA 100 from the jig, the first MCA 100 expanded slightly but held together stably and satisfactorily so that it could be handled easily and safely or packaged as a unit. A second MCA 100 was made in the same manner, and then these two were mounted in a short stack and fully compressed and operated as a fuel cell. The compression was nominal and the stack operated nominally indicating that the in-place formed fasteners worked well under compression.

EXAMPLE 2

Using the same procedure as in Example 1, 15 such MCAs 100 were assembled and then stacked and compressed to form a 5 kW fuel cell. The stack operated nominally and free of leaks, which it is believed a rigid fastening device would not permit because it could not accommodate the change in compressive strain.

EXAMPLE 3

During extended operation of the stack fabricated in Example 2, one of the MEAs 104 in one of the MCAs 100 was observed to degrade in performance. The stack was shut down, the compressive forces of the tie-rods and end-plates relieved, and the MCA 100 containing the faulty MEA 104 was removed. The original silicone rubber fasteners 110 were removed from the uni-polar plates 102 and discarded. Two new MEAs 104 were replaced in between the uni-polar plates 102 of the MCA 100, and the silicone rubber fasteners 110 were again formed in-situ to hold the MCA 100 together. This MCA 100 was placed back in the stack and the stack re-compressed and operated nominally. This example demonstrates that the in-place formed elastomeric fasteners allow the MCAs 100 to be easily rebuilt and reused.

EXAMPLE 4

This example is illustrative of methods for holding MCA components in precise alignment-prior to applying an in-situ curable elastomeric material. Two methods are described below for this purpose, with reference being made to FIGS. 2, 3, and 6.

In the above examples, the coolant channel lands are only approximately 1 mm wide, and in stacking the plates 102 and MEA 104, the cooling channels on the back of one plate 102 face the cooling channels on the adjacent plate 102. These channels must be kept precisely in alignment during compression so that the channel of one plate 102 and lands of the adjacent plate 102 do not slip into one another, and so that the maximum area for plate-to-plate contact can be maintained for minimal resistance. This has proven difficult and requires a carefully aligned jig for assembly.

Figure 6:
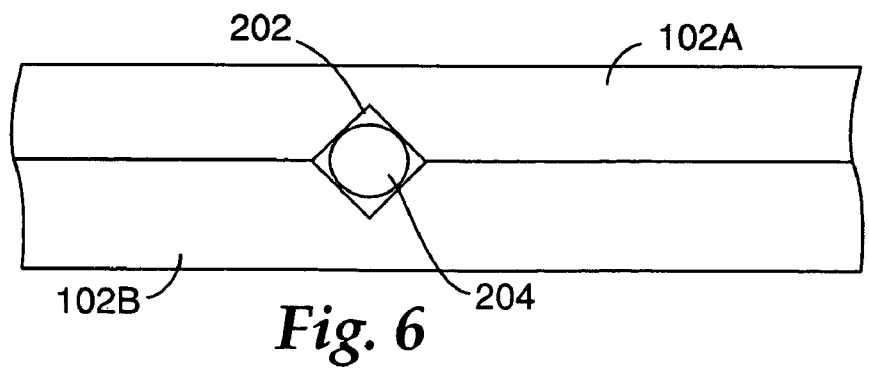
FIG. 6 illustrates an arrangement to facilitate precise alignment of MCA components during elastomeric fastener formation in-situ the MCA.

A device concept to assist this alignment and assembly process involves use of small ball bearings 202 (not necessarily of steel, but other materials as well), or cylindrical rods, both of appropriate diameter, to co-locate one uni-polar plate 102 on top of another. These alignment balls or pins 204 would fit into a V-shaped hole or slot 202 in the bottom plate 102B and a matching hole or slot 202 in the top plate 102A as shown in FIG. 6.

The alignment holes/slots 202 could be located anywhere on the plate 102, but would be most convenient on the outer perimeter. For 0.050" thick plates 102, the holes or slots 202 could be cut all the way or nearly all the way through the plates 102, so that, for example, if 0.045" of the plate thickness was used, the angle of the "V" could be selected, at least 45°, to accommodate a rod or sphere of diameter on the order of 0.863×0.045"×2=0.077".

As an alternative and more practical approach to hold the MEA 104 and uni-polar plates 102 in alignment during the elastomeric material injection step, a jig plate device was used to provide a series of rigid boundaries or guides to force the plates 102 to be precisely parallel to one another as they were stacked on top of each other and the MEA 104. A V-shaped notch was placed in the middle of the ends of the plates and force applied to the apex of the V-shaped notch by a mating wedge of sufficient height to make contact with all the plate layers in the stack.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What we claim is:

1. A fuel cell sub-assembly, comprising:
   a first flow field plate comprising a plurality of fastener apertures defined at a plurality of fastening locations;
   a second flow field plate comprising a plurality of fastener apertures defined at a plurality of fastening locations;
   a membrane electrode assembly situated between the first and second flow field plates and comprising a plurality of fastener apertures defined at a plurality of fastening locations, the plurality of fastener apertures of the membrane electrode assembly and the plurality of fastener apertures of the first and second flow field plates define fastening holes; and
   a form-in-place fastener formed of an elastomeric material disposed in a plurality of the fastening holes, wherein the elastomeric material facilitates volumetric displacement of the form-in-place fasteners in response to placing the fuel cell sub-assembly in compression.

2. The sub-assembly according to claim 1, wherein the elastomeric material facilitates volumetric displacement of the form-in-place fasteners into void volume within the fastening holes in response to placing the fuel cell sub-assembly in compression.

3. The sub-assembly according to claim 2, wherein the void volume defines volume within the fastening holes unfilled by the form-in-place fasteners at less than final compression of the fuel cell sub-assembly compression.

4. The sub-assembly according to claim 2, wherein the void volume defines volume of the fastening holes unfilled after in-situ formation of the form-in-place fasteners within the fastening holes.

5. The sub-assembly according to claim 1, wherein the elastomeric material facilitates volumetric displacement of the form-in-place fasteners into void volume within the form-in-place fasteners in response to placing the fuel cell sub-assembly in compression.

6. The sub-assembly according to claim 1, wherein the form-in-place fasteners are formed of a phase change elastomeric material.

7. The sub-assembly according to claim 1, wherein the form-in-place fasteners are formed of a curable elastomeric material.

8. The sub-assembly according to claim 1, wherein the form-in-place fasteners are formed of an in-situ curable elastomeric material.

9. The sub-assembly according to claim 1, wherein the form-in-place fasteners are formed of a silicone material.

10. The sub-assembly according to claim 1, wherein the form-in-place fasteners are formed of a rubber material.

11. The sub-assembly according to claim 1, wherein the form-in-place fasteners are formed of a dental impression material.

12. The sub-assembly according to claim 1, wherein the fastener apertures of the first and second flow field plates comprise a lip void adjacent an exterior surface of the first and second flow field plates, portions of the form-in-place fasteners within the lip voids offering mechanical capture of the first and second flow field plates.

13. The sub-assembly according to claim 1, wherein each of the first and second flow field plates has a thickness of about 6 mm or less.

14. The sub-assembly according to claim 1, wherein each of the first and second flow field plates has a thickness of about 1.25 mm or less.

15. The sub-assembly according to claim 1, wherein the fastening holes are sufficient in number to hold the sub-assembly elastomerically in in-situ cured registration, sufficient for handling prior to fuel cell stack assembly.

16. The sub-assembly according to claim 1, wherein the fuel cell sub-assembly comprises one fastening hole per about 15 $cm^2$ to about 25 $cm^2$ of flow field plate area.

17. The sub-assembly according to claim 1, wherein a ratio of flow field plate area to the sum of the minimal cross sectional area of the fastening holes ranges between about 200:1 and about 400:1.

18. The sub-assembly according to claim 1, wherein at least one of the first and second flow field plates is configured as a uni-polar flow field plate.

19. The sub-assembly according to claim 1, wherein at least one of the first and second flow field plates is configured as a bi-polar flow field plate.

20. The sub-assembly according to claim 1, wherein the second flow field plate is configured as a bi-polar flow field plate, the sub-assembly further comprising:
a third flow field plate comprising a plurality of fastener apertures defined at a plurality of fastening locations; and
a second membrane electrode assembly situated between the second and third flow field plates and comprising a plurality of fastener apertures defined at a plurality of fastening locations, the plurality of fastener apertures of the membrane electrode assemblies and the first, second, and third flow field plates defining the fastening holes within which the form-in-place fasteners are disposed.

21. The sub-assembly according to claim 1, further comprising:
a third flow field plate comprising a plurality of fastener apertures defined at a plurality of fastening locations;
a fourth flow field plate comprising a plurality of fastener apertures defined at a plurality of fastening locations; and
a second membrane electrode assembly situated between the third and fourth flow field plates and comprising a plurality of fastener apertures defined at a plurality of fastening locations, the plurality of fastener apertures of the membrane electrode assemblies and the first, second, third, and fourth flow field plates defining the fastening holes within which the form-in-place fasteners are disposed.

22. A method of assembling a fuel cell sub-assembly, comprising:
providing a first flow field plate comprising a plurality of fastener apertures defined at a plurality of fastening locations;
providing a second flow field plate comprising a plurality of fastener apertures defined at a plurality of fastening locations;
providing a membrane electrode assembly situated between the first and second flow field plates and comprising a plurality of fastener apertures defined at a plurality of fastening locations;
aligning the plurality of fastener apertures of the membrane electrode assembly and the first and second flow field plates to define fastening holes; and
flowing a pre-elastomeric material into the fastening holes to form form-in-place fasteners therein.

23. The method according to claim 22, wherein the pre-elastomeric material is subject to a phase change to form an elastomeric material.

24. The method according to claim 22, wherein the pre-elastomeric material comprises a hydrocarbon thermal phase change material.

25. The method according to claim 22, further comprising curing the pre-elastomeric material to form an elastomeric material.

26. The method according to claim 25, wherein the elastomeric material is substantially flush with surfaces of the first and second flow field plates.

27. The method according to claim 22, further comprising solidifying the pre-elastomeric material to form an elastomeric material.

28. The method according to claim 27, wherein the elastomeric material is substantially flush with surfaces of the first and second flow field plates.

29. The method according to claim 22, further comprising curing the pre-elastomeric material to form an elastomeric material, wherein the elastomeric material cures in accordance with an addition cure, condensation cure, radiation cure, thermal cure, or free radical cure.

30. The method according to claim 22, further comprising curing the pre-elastomeric material to form an elastomeric material, wherein the elastomeric material comprises a silicone material.

31. The method according to claim 22, further comprising curing the pre-elastomeric material to form an elastomeric material, wherein the elastomeric material comprises a rubber material.

32. The method according to claim 22, further comprising curing the pre-elastomeric material to form an elastomeric material, wherein the elastomeric material comprises a dental impression material.

33. The method according to claim 22, further comprising mechanically capturing the first and second flow field plates upon curing or solidifying of the pre-elastomeric material.

34. The method according to claim 22, further comprising providing an assembling fixture configured to facilitate assembly of the fuel cell sub-assembly, and using the assembling fixture to align the plurality of fastener apertures of the membrane electrode assembly and the first and second flow field plates.

35. A method of accommodating compression within a fuel cell sub-assembly, comprising:
providing a first flow field plate comprising a plurality of fastener apertures defined at a plurality of fastening locations;
providing a second flow field plate comprising a plurality of fastener apertures defined at a plurality of fastening locations;
providing a membrane electrode assembly situated between the first and second flow field plates and comprising a plurality of fastener apertures defined at a plurality of fastening locations, the plurality of fastener apertures of the membrane electrode assembly and the first and second flow field plates defining fastening holes;

providing a form-in-place fastener comprising an elastomeric material disposed in each of the fastening holes;

placing the fuel cell sub-assembly in compression; and accommodating compressive strain by the form-in-place fasteners in response to placing the fuel cell sub-assembly in compression.

36. The method according to claim 35, wherein accommodating compressive strain by the form-in-place fasteners comprises displacing a volume of the form-in-place fasteners into void volume within the fastening holes.

37. The method according to claim 35, wherein accommodating compressive strain by the form-in-place fasteners comprises displacing a volume of the form-in-place fasteners into void volume within the form-in-place fasteners.

38. A fuel cell sub-assembly, comprising:

a first flow field plate comprising a plurality of fastener apertures defined at a plurality of fastening locations;

a second flow field plate comprising a plurality of fastener apertures defined at a plurality of fastening locations;

a membrane electrode assembly situated between the first and second flow field plates and comprising a plurality of fastener apertures defined at a plurality of fastening locations, the plurality of fastener apertures of the membrane electrode assembly and the first and second flow field plates defining fastening holes; and means, disposed within the fastening holes, for elastically accommodating compressive strain responsive to placing the fuel cell sub-assembly in compression.

\* \* \* \* \*

UNITED STATES PATENT AND TRADEMARK OFFICE
CERTIFICATE OF CORRECTION

PATENT NO.         : 7,311,990 B2                                   Page 1 of 1
APPLICATION NO. : 11/025267
DATED                 : December 25, 2007
INVENTOR(S)        : Mark K. Debe It is certified that error appears in the above-identified patent and that said Letters Patent is hereby corrected as shown below:

Column 1
Line 22;   delete "respectively,positions"
           and insert -- respectively positions -- therefore.

Column 2
Line 6;    delete "field-plates" and insert -- field plates -- therefore.

Column 4
Line 37;   delete "(ICM)," and insert -- (ICM)), -- therefore.

Column 10
Line 44;   delete "3:" and insert -- 3. -- therefore.

Column 11
Line 34;   delete "alignment-prior"
           and insert -- alignment prior -- therefore.

Signed and Sealed this

Twenty-seventh Day of May, 2008

JON W. DUDAS
*Director of the United States Patent and Trademark Office*